(12) United States Patent
McGrew et al.

(10) Patent No.: US 8,891,770 B2
(45) Date of Patent: Nov. 18, 2014

(54) PAIR-WISE KEYING FOR TUNNELED VIRTUAL PRIVATE NETWORKS

(71) Applicant: Cisco Technology, Inc., San Jose, CA (US)

(72) Inventors: David A. McGrew, Poolesville, MD (US); Brian E. Weiss, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/042,906

(22) Filed: Oct. 1, 2013

(65) Prior Publication Data

US 2014/0025945 A1 Jan. 23, 2014

Related U.S. Application Data

(63) Continuation of application No. 12/394,847, filed on Feb. 27, 2009, now Pat. No. 8,548,171.

(51) Int. Cl.
*H04L 9/00* (2006.01)
*H04L 9/08* (2006.01)
*H04L 29/06* (2006.01)

(52) U.S. Cl.
CPC ............ *H04L 9/0827* (2013.01); *H04L 9/0891* (2013.01); *H04L 63/0272* (2013.01); *H04L 9/0833* (2013.01); *H04L 63/164* (2013.01); *H04L 63/065* (2013.01); *H04L 9/0866* (2013.01)
USPC ............ 380/277; 380/259; 380/260; 380/283

(58) Field of Classification Search
None
See application file for complete search history.

(56) References Cited

U.S. PATENT DOCUMENTS

| 7,234,063 B1 * | 6/2007 | Baugher et al. ............... 713/189 |
| 8,548,171 B2 * | 10/2013 | McGrew et al. .............. 380/277 |
| 2003/0056114 A1 * | 3/2003 | Goland ........................ 713/201 |
| 2005/0063542 A1 * | 3/2005 | Ryu .............................. 380/259 |
| 2007/0016663 A1 * | 1/2007 | Weis ............................. 709/223 |
| 2010/0220856 A1 * | 9/2010 | Kruys et al. .................... 380/44 |

* cited by examiner

*Primary Examiner* — Kaveh Abrishamkar
(74) *Attorney, Agent, or Firm* — Tucker Ellis LLP

(57) ABSTRACT

In an embodiment, a method for generating and distributing keys retains the scalability of a group VPN, but also provides true pair-wise keying such that an attacker who compromises one of the devices in a VPN cannot use the keys gained to decrypt the packets from the other gateways in the VPN, or spoof one of the communicating gateways. The method is collusion resistant when co-operating attackers overtake several VPN gateways and observe the keys stored in those gateways. In an embodiment, a VPN gateway comprises a cryptographic data processor configured to encrypt and to decrypt data packets; group key management logic; and Key Generation System logic. In one approach a gateway performs, in relation to adding a group member, receiving in a security association message secret data for use in the KGS; and derives keys for secure communication with one or more peer VPN gateways using the secret data.

20 Claims, 6 Drawing Sheets

PAIR-WISE KEYING FOR TUNNELED VIRTUAL PRIVATE NETWORKS

CROSS-REFERENCE TO RELATED APPLICATIONS

This application is a continuation of U.S. patent application Ser. No. 12/394,847 filed Feb. 27, 2009.

TECHNICAL FIELD

The present disclosure generally relates to cryptography as used in computer networks. The disclosure relates more specifically to techniques for distributing keys to gateways for virtual private networks.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The Group Domain of Interpretation (GDOI) as defined in M. Baugher et al., "The Group Domain of Interpretation," Request for Comments (RFC) 3547 of the Internet Engineering Task Force (IETF) (December 2002) is currently used in certain virtual private network (VPN) systems to distribute group keys to a group of VPN gateways attached to a private wide area network (WAN), such as a multi-protocol label switching (MPLS) network. In one approach, large groups of VPN gateways are configured to communicate with each other such that eavesdroppers cannot view, modify, or replay encrypted packets between sent between the gateways. Group keying can be used, and GDOI can be used to provide group keys to tunneling technologies (such as dynamic multipoint VPN [DMVPN] and Layer 2 Tunneling Protocol [L2TPv3] tunnels).

In one approach, all VPN gateways install and use the same keys. This is often an adequate level of security because each VPN gateway is trusted to pass the same data to any other gateway, and all VPN gateways are trusted identically. However, if group keys available on any VPN gateway are revealed to an attacker, then the attacker can eavesdrop on all traffic in the entire VPN. Furthermore, the attacker can inject packets claiming to be from any of the legitimate VPN gateways.

Some users may prefer that the threat of eavesdropping and spoofing be reduced or otherwise mitigated while still maintaining the scalability of the group VPN. In particular, some VPN gateways are installed on premises that are not physically secured or managed by the VPN gateway security administrators. The administrators of such VPN gateways are legitimately concerned that an attacker will obtain access to the VPN gateway and attempt to extract its keys.

DETAILED DESCRIPTION

Figure 1:
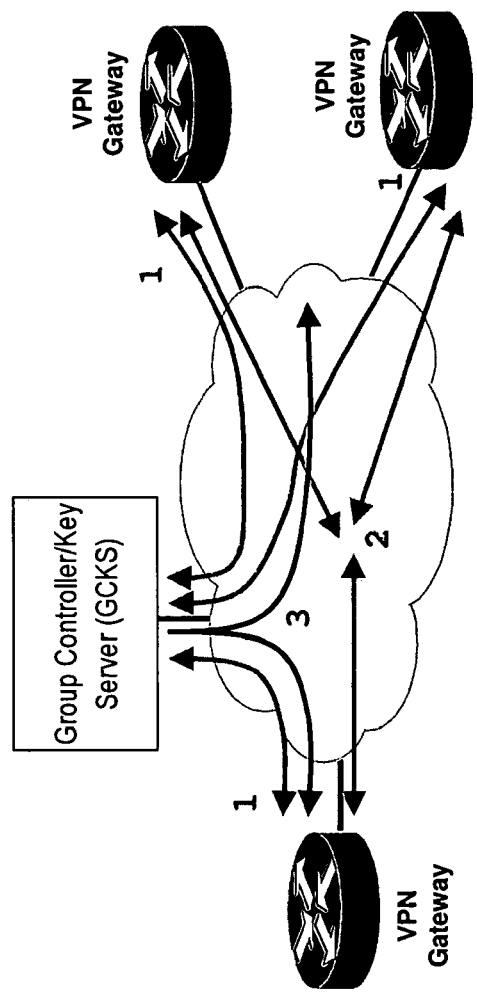
FIG. 1 illustrates a network and message flows providing an overview of group keying for virtual private networks (VPNs).

Pair-wise keying for tunneled Virtual Private Networks (VPNs) is described. In the following description, for the purposes of explanation, numerous specific details are set forth in order to provide a thorough understanding of the present invention. It will be apparent, however, to one skilled in the art that the present invention may be practiced without these specific details.

In other instances, well-known structures and devices are shown in block diagram form in order to avoid unnecessarily obscuring the present invention.

Embodiments are described herein according to the following outline:

1.0 General Overview
   2.0 Group Keying Fundamentals
      2.1 Overview of Group Keyed VPNs
      2.2 Eavesdropping and Spoofing Threats to Group Keyed VPNs
      2.3 Goals for Pair-Wise Keying for Large-Scale Mesh VPNs
      2.4 Deriving Pair-Wise Keys
      2.5 Revocation of Credentials for VPN Gateways
   3.0 Method of Generating Pair-Wise Keys from a Group Key with GDOI
   Using KGS and LHK for Revocation of Compromised VPN Gateways
      3.1 GDOI Processing
      3.2 ESP Sequence Numbers and Counter Mode IV
      3.3 Example Use Case: DMVPN (Without NAT)
      3.4 NAT Considerations
   4.0 Implementation Mechanisms—Hardware Overview
   5.0 Extensions and Alternatives
   1.0 General Overview In an embodiment, a method for generating and distributing keys retains the scalability of a group VPN, but also provides true pair-wise keying such that an attacker who compromises one of the devices in a VPN cannot use the keys gained by that compromise to decrypt the packets sent to or received from the gateways in the VPN other than the compromised device, nor will it be able to successfully spoof one of the communicating gateways. The method is also resistant to collusion when co-operating attackers overtake several VPN gateways and observe the keys stored in those gateways.

In an embodiment, a data processing apparatus comprises a cryptographic data processor configured to encrypt and to decrypt data packets; group key management logic coupled to the cryptographic data processor and that is configured to send and receive messages in conformance with a Group Key Management (GKM) protocol; and Key Generation System (KGS) logic; wherein the group key management logic is configured to perform, in relation to adding a group member, receiving in a security association (SA) message secret data for use in the KGS; wherein the group key management logic is configured to derive keys for secure communication with one or more peer VPN gateways using the secret data.

In an embodiment, the group key management logic is configured to perform the receiving in response to sending a join request message to the key server.

In an embodiment, the GKM logic comprises group domain of interpretation (GDOI) pairwise keying logic configured to implement GDOI and the KGS logic comprises Blom symmetric KGS logic configured to implement a Blom SKGS.

In an embodiment, the key management logic is configured to derive keys for any of encryption, decryption, generating authentication tags for messages, generating integrity check values for messages, or verifying authentication tag pairs in connection with the secure communication.

In an embodiment, the group key management logic is further configured to receive a request to install an IPSec security association for a particular peer VPN gateway, to generate a pairwise key for use with the particular peer VPN gateway based on the KGS state data, to use a key derivation function to generate two unidirectional keys, to provide the two unidirectional keys to the cryptographic data processor, and to start encrypted communications with the particular peer VPN gateway using the cryptographic data processor and the two unidirectional keys.

In an embodiment, the system further comprises dynamic multipoint VPN logic and GDOI key server logic coupled to an IPSec security subsystem and configured to perform GDOI key server functions in conformance with GDOI.

In an embodiment, the apparatus further comprises generating an N by N Blom SKGS matrix (D), wherein N is equal to a collusion resistance value.

In an embodiment, the apparatus further comprises generating a Blom SKGS matrix $(K)=(DG)^T G$, wherein D is a secret matrix, G is a public generator matrix corresponding to a Galois field, and $(DG)^T$ is a transpose of matrices DG, and assigning one row of matrix (K) to a VPN gateway associated with the apparatus.

In an embodiment, the secret data for use in the KGS comprises a row of a Blom SKGS matrix $(U)=(DG)^T$ such that K=UG, and the identifier is associate with the row. In an embodiment, the group domain of interpretation (GDOI) pairwise keying logic is further configured to receive a rekey message from the key server, and in response to the rekey message, to begin using keys in a logical key hierarchy (LKH) key array as new keys.

In an embodiment, the replacement key data comprises encrypted pre-positioned KGS keying material, wherein the group key management logic is further configured to receive a group membership change message from the key server, wherein the group membership change message includes a key under which the pre-positioned Blom SKGS keying material was encrypted, and in response to the group membership change message, to decrypt the pre-positioned Blom SKGS keying material using the key and to begin using a new key as a session key in encrypting communications with the key server.

Embodiments also encompass a computer-readable volatile or non-volatile storage media storing one or more sequences of instructions which when executed by one or more processors cause the one or more processors to perform the functions shown and described herein.

In another embodiment, an apparatus comprises one or more processors; a plurality of network interfaces that are operable to communicatively connect to one or more packet-switched networks; virtual private network (VPN) logic encoded in one or more tangible media for execution and when executed operable at least to provide a VPN gateway; gateway logic encoded in one or more tangible media for execution and when executed operable at least to send a joint request to a group domain of interpretation (GDOI) key server, wherein the join request includes a group identifier that identifies a group security association that includes the VPN gateway and one or more other VPN gateways that are provided on one or more network elements; receive a security association (SA) payload from the GDOI key server, wherein the SA payload includes first information that specifies a group-wise policy; second information including a SA-KEK (key encrypting key) that describes a group rekey policy; and a set of SA-TEK (traffic encrypting key) payloads that describe how to encrypt data packets; determine whether the VPN gateway satisfies the group-wise policy, the SA-KEK, and the SA-TEK payloads; when the VPN gateway satisfies the group-wise policy, the SA-KEK, and the SA-TEK payloads, return an acknowledgment to the GDOI key server wherein the acknowledgement indicates that the VPN gateway is committed to becoming a group member of the group security association; receive from the GDOI key server a key distribution (KD) payload, wherein the KD payload includes a SKGS SA-TEK state information for the VPN gateway; store the SKGS SA-TEK state information at the VPN gateway; and based on the SKGS SA-TEK state information, generate a pair-wise key for securely communicating with a particular VPN gateway, of the one or more other VPN gateways, that is provided on a particular network element from the one or more network elements.

2.0 Group Keying Fundamentals

For purposes of illustrating clear examples, certain embodiments are described in terms of the GDOI, Blom SKGS, and LKH specifications, protocols, or operational techniques. However, alternative embodiments may be implemented in the context of any group key management system, data transport, key generation system, and/or group management system.

2.1 Overview of Group Keyed VPNS

Networks of large business enterprises increasingly carry voice over Internet Protocol (VoIP) traffic and video traffic that are distributed using IP multicast. To support this traffic, more networks are deployed using a mesh configuration rather than a traditional hub and spoke configuration. A mesh of VPN gateways is a set of VPN gateways that exchange encrypted IP packets between them based on how the packets are routed, and the routing of those packets take many direct paths between VPN gateways.

In many cases, the number of VPN gateways surrounding a WAN network of a business enterprise is on the order of hundreds of devices. The traditional solution of setting up pair-wise key management connections (e.g., Internet Key Exchange/Internet protocol security (IKE/IPsec) connections) between the VPN gateways is problematic when the nature of the IP traffic creates a corresponding number of hundreds and thousands of IKE/IPsec sessions.

A group keyed VPN uses an alternative method of using IPsec to protect traffic as it passes through the private WAN network. A group keyed VPN avoids the scaling issues by replacing pair-wise IKE connections with a dynamic group key management system. FIG. 1 illustrates a network and message flows providing an overview of group keying for VPNs. The dynamic group security in a group keyed VPN has three steps as shown by numbered arrows in FIG. 1.

In step 1, each VPN gateway, also known as a Group Member, contacts a centralized Group Controller/Key Server (GCKS) (e.g., a GDOI Key Server) that authenticates the VPN gateway, and then validates that it is an authorized device in the group VPN. The GCKS then returns dynamic VPN IPsec policy data and current keys to each VPN gateway. Step 1 is termed the Group Key Management (GKM) registration protocol.

In step 2, the VPN gateway uses the group policy to encrypt and decrypt IP packets that are protected by the VPN, using IPsec. VPN Gateways do not directly authenticate each other, but use of the current group keys is required in order to participate in the group.

In step 3, the Key Server distributes new group keys to the VPN Gateways, as needed using a GKM rekey protocol.

Using these steps, a group keyed VPN can efficiently and securely protect traffic between an authorized mesh of VPN gateways.

2.2 Eavesdropping and Spoofing Threats to Group Keyed VPNS

Typically group keyed VPN devices share a single set of security associations comprising session keys and associated policy. This approach allows IPsec to be deployed in full-mesh networks where traditional point-to-point IPsec VPNs are not feasible, and is simple to configure and manage. The risk of deploying a single set of security associations is acceptable when the set of VPN gateways are properly secured physically and with host security.

However, when physical security is not guaranteed, a VPN gateway may be more susceptible to an attacker gaining access to the VPN gateway. Example threats include eavesdropping and spoofing, which is the creation of false VPN packets for a malicious purpose. The approach herein that reduces or eliminates the damage of an attacker gaining access to the keying material used to generate session keys stored on a particular VPN gateway, by distributing private pair-wise keys, or keying material that allows a group member to compute its pairwise keys, within the group.

2.3 Goals for Pair-Wise Keying for Large Scale Mesh VPNS

Group keyed VPNs are used to protect Large-Scale Mesh VPNs because they provide a measure of scale that is difficult to obtain with true pair-wise keying in conventional IKE/IPsec VPNs. In an embodiment, the security of group keyed VPNs is increased through the use of pair-wise keys and retains the scalable operational characteristics of a group keyed VPN. In one embodiment, a system deriving pair-wise keys is based on the following security and operational goals. Various embodiments may fulfill only one or more of the specified goals and not all.

Thus, the goals stated in this section are not requirements for an embodiment and are not intended to limit the appended claims or define the invention. Operational goals for various embodiments include:

The system scalability is not substantially reduced. Group communications with pair-wise keying work as efficiently and without any further latency as without pair-wise keying. A typical size for a large Mesh VPN is 2000 VPN gateways and 2-4 GCKS systems.

GCKS systems are able to jointly manage the pair-wise keying state.

Memory usage on VPN gateways and processing load on VPN gateways are minimized.

The size of a broadcast GKM rekey message is small enough such that the rekey message is not fragmented in a network using a typical 1500 byte maximum transmission unit (MTU) value.

Initial keying and re-keying pair-wise keys between group members are synchronized such that communications between any two group members is not lost due to the use of a key not present on both VPN gateways.

Existing GKM protocol flows are used. A Mesh VPN uses a GKM registration protocol, and either a one-way multicast rekey message or acknowledged unicast rekey messages.

Security goals for various embodiments include:

A Pair-wise key between any two VPN gateways is not available to or derivable by any other VPN gateway as part of the system.

A VPN gateway can reliably and uniquely identify a peer VPN gateway in order to determine the proper key to use with that VPN gateway. VPN gateways may be identified by a static IP address, but dynamic addressing also can be used.

A VPN gateway has a one-to-one mapping between a peer and a pair-wise key.

The system can create and maintain pair-wise keys between up to 4000 gateways.

The system can revoke any VPN gateway suspected of being compromised without affecting communication between the remaining VPN gateways. In this context, revocation means to make any keying material held by the revoked VPN gateway to be unacceptable to authorized VPN gateways, with the result that it can no longer exchange encrypted communications with authorized VPN gateways.

The GCKS can communicate the identities of revoked VPN gateways to authorized VPN gateways. The VPN gateways no longer accept the revoked VPN gateways as peers, for example, by dropping encrypted packets received from the de-authorized gateways, and do not send packets to the de-authorized gateways.

If there is a mathematical relationship between pair-wise keys, the system includes collusion protection, to guard against attackers obtaining keys from a set of VPN gateways. There is a certain number (denoted as a threshold "k") defining how many VPN gateways may be compromised before the pair-wise keys of the entire system are considered compromised. The value "k" can be configurable by administrators.

At or before "k" VPN gateways have been detected as compromised, the GDOI Key Server can distribute a completely new set of pair-wise keys to VPN Gateways, even when a collusion-resistant value of "k" is not used. This approach is used because as the number of VPN Gateways known to be compromised grows, system administrators will have a correspondingly less confidence in the integrity of remaining VPN Gateways.

IPsec ESP sequence numbers are incremented over the life of the SA. If the IPsec SA is de-installed and re-installed by a sender, it does not re-use sequence numbers.

IPsec ESP counter mode initialization vectors (IVs) are unique over the life of the SA. If the IPsec SA is de-installed and re-installed by a sender, it does not re-use IV values.

Further, in various embodiments, the system is able, to re-initiate the entire group in the event that system administrators lose complete confidence in the integrity of the Mesh VPN. The specific steps performed to re-initiate the entire group may vary in different deployments. In other embodiments, an agent in the Mesh VPN (for example, a Key Server or NHRP server) can communicate the identities of authorized VPN Gateways, so that a VPN gateway can identify the destination of an ESP packet.

2.4 Deriving Pair-Wise Keys

R. Blom, An Optimal Class of Symmetric Key Generation Systems, Advances in Cryptology: Proceedings of Eurocrypto 84, Lecture Notes in Computer Science, Vol 209, Springer-Verlag, Berlin, 1984, pp. 335-338, addresses the problems of sharing pair-wise secret information on a group of systems. The Blom Symmetric Key Generation System (SKGS) generates pair-wise secrets without requiring each group of N members to have (N(N−1)/2) independent secrets. While N−1 secrets can be stored on a group member, they are computed as needed. That is, a group member need only store keys for peers with which it has encrypted packets to or decrypted packets from. Further, the Blom SKGS is resistant against k colluding group members. That is, combining the keying material of less than k group members will not reveal pair-wise keys between two group members that are not colluding. However, if the keying material from k group members is stolen and combined, then the attacker will have enough keying material to eavesdrop or spoof other group members.

In overview, in the Blom approach, the key server generates two matrices of keying material. A first matrix (G) is public, and each group member can generate the parts of the matrix that it needs. Matrix (G) is a "generator matrix" corresponding to a Galois Field. A Galois Field is also a part of the Galois Counter Mode (GCM) mode of operation for the Advanced Encryption Standard (AES). The second matrix (D) is secret. A matrix (K) containing pair-wise keying material is computed as $K=(DG)^T G$, in which $X^T$ denotes the transpose of a matrix X. An alternate representation defines matrix (U) as $U=(DG)^T$ where $K=UG$.

Each group member is given one row from matrix (U). This row consists of only k elements, each of which is the size of a single key. The value k can be much less than N in many cases. No two group members are given the same row. When a group member performs a certain set of matrix algebra operations using that member's single row of (U) and the public matrix (G), that group member can derive a set of keys where each is shared with a single other group member.

In summary, each group member is given the following information: Values necessary to compute (G), comprising public information that does not need to be distributed from the key server and that could be hard coded, for example; and a particular row of (U), not given to any other group member. Each group member is expected to compute a particular column of matrix K, where K=UG. This column contains as many elements as there are group members, and exactly one key is shared with each other group member. The keys in K can be generated on demand, when needed.

The Blom SKGS system can be efficiently used as part of a GKM group. Each VPN gateway shares a private key with every other VPN gateway; thus, a pair-wise key between any two VPN gateways is not available to or derivable by any other VPN gateway as part of the system. Further, the system is collision-resistant. The GCKS is the only entity needing to compute a large amount of keying material. Only base keying material (i.e., matrix D) need be shared between GCKS entities acting as key servers within the same group, where (D) is of size (kk). Each key server can independently compute the same finite field values once they are given (D), satisfying the goal that the set of GCKS entities can jointly manage the pair-wise keying state. The amount of keying material distributed to each VPN gateway is relatively small, and can be distributed during a GKM registration. Both the GCKS entities and VPN Gateways can efficiently derive pair-wise keys for each peer, and can do so on demand to reduce key storage costs; thus memory usage on VPN gateways and the processing load on VPN gateways are minimized. In an embodiment, a Blom SKGS forms a foundation of a method of generating pair-wise keys for a group of VPN gateways.

A symmetric Key Generation System, or KGS for short, is a system that enables a pair of users to generate a secret pairwise key, using secret data that was issued to them by a trusted authority. Each user of the system gets a different set of data from the authority. The algorithm by which an entity generates a pairwise key to communicate with another entity uses the secret data of the first user and the identifier of the second user. The identifiers are controlled by the trusted authority. These ideas were introduced by Blom.

When a user is introduced into the system, that user is issued secret data and a particular identifier, by the authority. The KGS itself provides no way to securely communicate the shared secret data between the authority and the users; instead, there must be a secure channel between the authority and the user over which this data is passed. Typically it is assumed that the secret data and the identifier are "pre-positioned", i.e. they are given to a user by the authority at a point when the two entities are physically co-located.

When two users of the system need to communicate securely, the compute a pairwise key as follows. They each use an algorithm that takes as input their own secret data and the identity of the other entity with which the pairwise key is to be shared; the pairwise key is provided as output. This system can be used to generate n(n−1)/2 keys that can be used for pairwise communication between n users. Each user can generate any of the n−1 keys that it might need on demand. The main advantage of the KGS is that the storage used by each user to store the secret data issued to them by the authority is much smaller than n−1 keys.

A KGS is called k-secure if the compromise of k or fewer users does not affect the security of the system, where the threshold k is a parameter of the system. It is possible to make a KGS in which each user stores O(k) data, where k is independent of the number n of users of the system.

Blom described a particular KGS. In general, an abstract KGS can be considered to be a particular set of algorithms. There is a one algorithm by which the authority computes the secret data to be given to the users, and another algorithm by which the users compute the pairwise keys from their secret data and the identifier of the other user. For purposes of broadly describing the inventive concepts, this document describes examples in the context of an abstract KGS; in a practical embodiment, any KGS could be used.

The GKM protocol provides a way to dynamically add members into the KGS system. A member can be added at any time, using the GKM protocol to authenticate the member and to securely distribute the KGS data to that user.

2.5 Revocation of Credentials for VPN Gateways

The Blom SKGS can tolerate up to "k" colluding compromised VPN gateways. However, other mechanisms can be used to improve revocation security. In particular, when a VPN gateway is suspected or known to be compromised, VPN administrators can immediately revoke the authorization credentials of the gateway, including the pre-shared key or public key certificate. This removes the ability of the compromised gateway to register to the GCKS.

Further, other VPN gateways can be alerted about which VPN gateways are no longer trustworthy and should be shunned. This approach implements a "soft" revocation method in which gateways that have been de-authorized are removed from the group, much as certificates can be revoked via a certificate revocation list distributed by a certificate issuing authority. Although this action is not a traditional group-key revocation in which new keying material is delivered to remaining authorized VPN gateways, a "soft" revocation allows immediate revocation with a minimal effect on the remaining group members.

Distribution of information about revoked VPN gateways is the responsibility of the GCKS. In an embodiment, the key server ensures that the identities of the revoked gateways are removed from the list of authorized gateways for the group.

When "k" VPN gateways have been de-authorized from the group, the group should be re-keyed. In one approach to re-keying the group, each VPN gateway is required to re-register with the VPN gateway. However, this immediate VPN outage is disruptive to the group. Therefore, in an embodiment, a different method of revocation is used when "k" VPN gateways have been de-authorized from the group.

In a "hard revocation" approach, a group management algorithm (such as LKH) is used for a true revocation of VPN gateways that are known to be compromised. A true revocation is performed once "k" VPN gateways have been de-authorized from the group. A true revocation may also be appropriate when fewer VPN gateways are known to be comprised, since the VPN administrators may not have yet detected all compromised VPN gateways.

When LKH policy is used as part of a group, a GKM rekey event transmits a new group KEK to the remaining authorized gateways. When all authorized VPN gateways use a single set of group keys, the new group KEK can be used to protect a subsequent GKM rekey message that distributes new group keys. This ensures a quick change of keying material immediately following a hard revocation.

However, when a KGS is used, the new keying material cannot be immediately distributed in a GKM rekey message, because each VPN gateway needs to be given an individual set of keying material. Including all of the new keying material in a single GKM rekey message would probably require a message so large that fragmentation would result, and could also probably exceed the maximum size of a UDP packet. Therefore, in an embodiment, one of the following different approaches is used.

In an embodiment, the replacement keying material is distributed to the group members during the initial GKM registration, but encrypted under a key ("B-KEK") known only to the GCKS. At such time as the replacement keying material is needed, the GCKS uses LKH to revoke access to the compromised VPN gateways. Subsequent to the change of group KEK, the B-KEK is released in a GKM rekey message to the remaining authorized VPN gateways. Upon receiving the B-KEK, VPN gateways destroy their current pair-wise keys, and replace them based on the previously received keying material. As a result, the new keying material is made effective after a single GKM rekey message. The group can switch to the new keying material immediately as well.

Once the pre-distributed replacement keying material has been moved to be the current keying material, the key server distributes another set of KGS keying material. As discussed previously, each VPN gateway requires a unique set of keying material that cannot be distributed using the GKM rekey message. In one embodiment, the GCKS sends a flag in a GKM rekey message that results in the VPN gateways re-registering on a phased basis, to prevent the GCKS from being overloaded with registrations. Alternatively, a new GKM protocol could be used to distribute the new KGS keying material to an individual VPN gateway. The GCKS would initiate delivery of the new keying material to the group members, and then expect an acknowledgement in return. Since the GCKS is initiating the protocol exchange, this method has the advantage of the GCKS being able to control its load.

3.0 Method of Generating Pair-Wise Keys from a Group Key with GDOI Using KGS and LKH for Revocation of Compromised VPN Gateways In an embodiment, logic in VPN gateways implements a method of generating pair-wise keys from a group key with GDOI and based on a KGS, and using LKH for revocation of compromised VPN gateways. In an embodiment, Blom pair-wise keys are used to create ESP tunnel mode packets between the VPN gateways. In an embodiment, a set of GDOI co-operative key servers distributes mesh VPN group policy and keys to VPN gateways. The entire KGS data structure of pair-wise keys is organized on the GDOI key server, which distributes the relevant sub-group data to group members when they register with the key server.

Each set of VPN gateways is organized into pairs of gateways, such that the two VPN gateways within a pair are able to communicate using pair-wise session keys. For example, in a VPN with 1,000 VPN gateways, the keying material would allow any VPN gateway to derive a private session key with any other VPN gateway.

Figure 2:
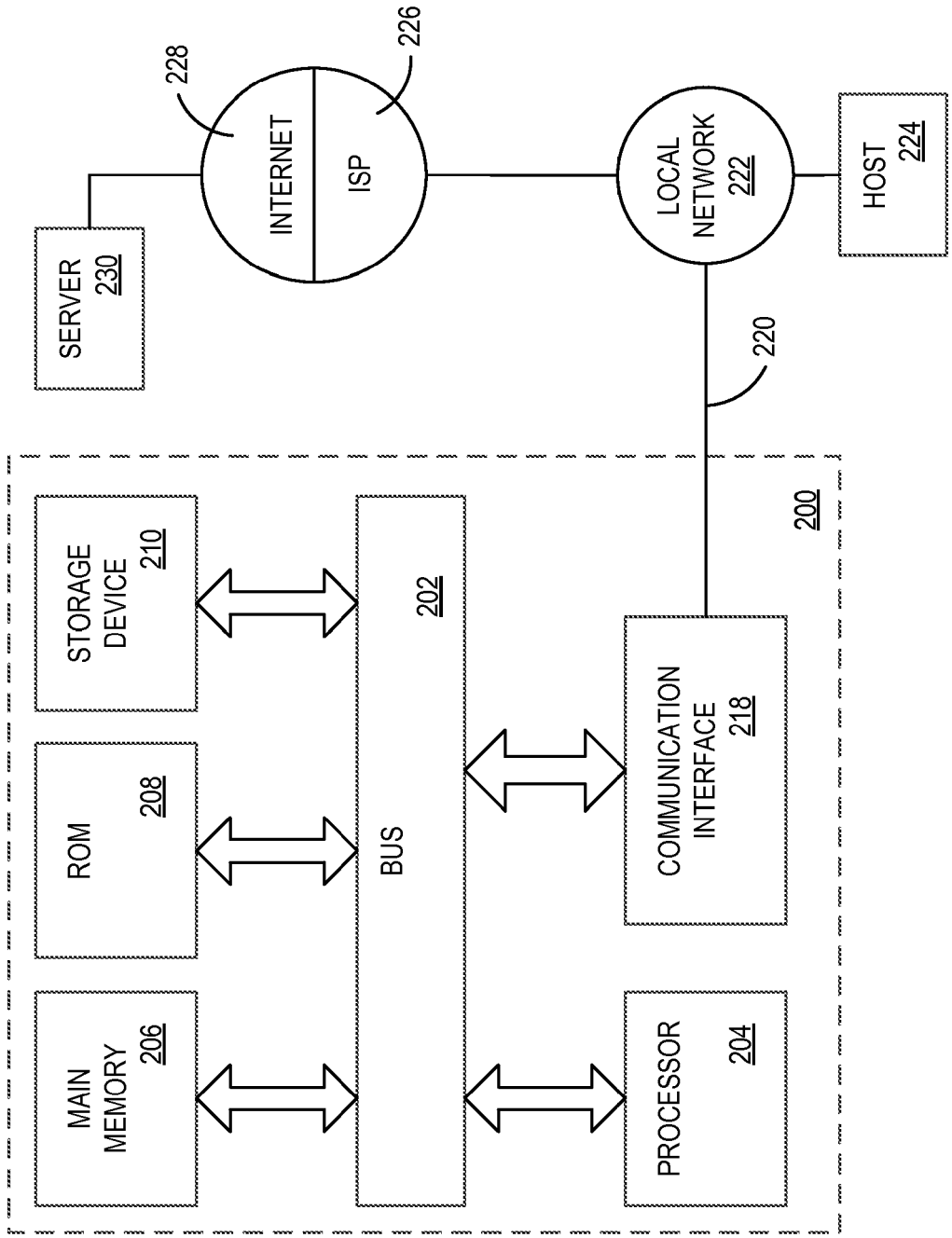
FIG. 2 illustrates a computer system upon which an embodiment may be implemented.
Figure 3:
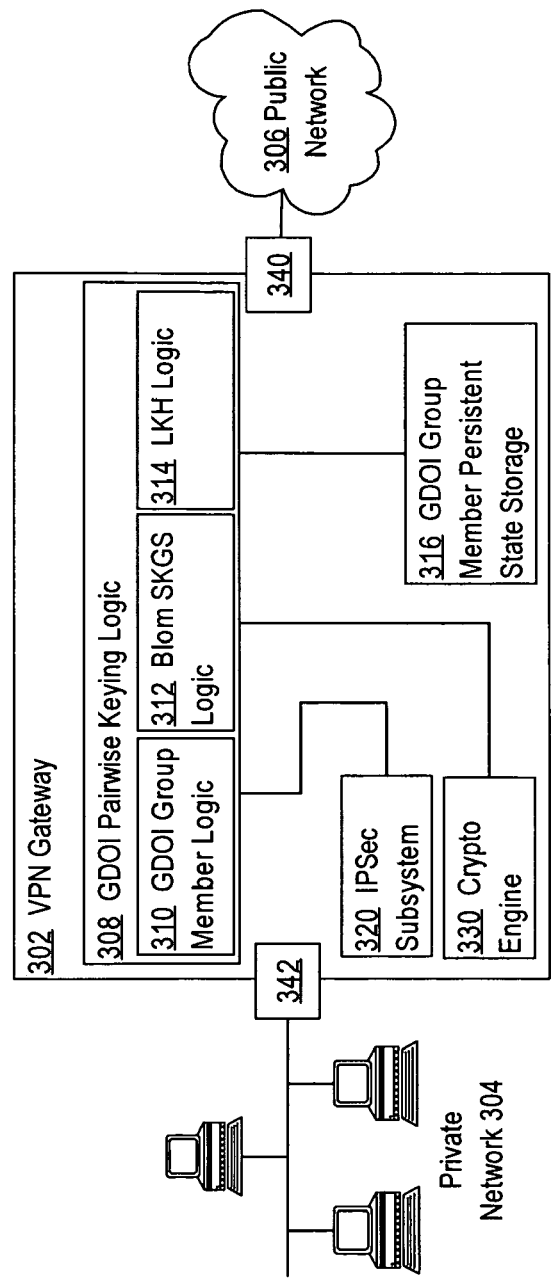
FIG. 3 illustrates an example VPN gateway according to an embodiment.

FIG. 3 illustrates an example VPN gateway according to an embodiment. In the example of FIG. 3, VPN gateway 302 is coupled in a position interposed between an untrusted or public network 306 and a private network 304. One or more outward facing interfaces 340 couple the VPN gateway 302 to the public network 306 and one or more inward facing interfaces 342 couple the VPN gateway to the private network 304. VPN gateway 302 further comprises GDOI Pairwise Keying Logic 308, an IPSec subsystem 320, a crypto engine 330, and GDOI Group Member Persistent State Storage 316. In various embodiments, VPN gateway 302 comprises other functional elements that are omitted from FIG. 3 for purposes of illustrating a clear example, such as a packet routing or switching system, a central processing unit, volatile memory, a terminal interface, and other functional units of a packet router or switch. For example, some of the elements of FIG. 2 may be integrated into VPN gateway 302.

In an embodiment, GDOI Pairwise Keying Logic 308 comprises one or more circuits, gates, application-specific integrated circuits, program logic, or a combination that cooperate to implement the functions described herein in Section 3. In an embodiment, GDOI Pairwise Keying Logic 308 integrates and comprises all of GDOI Group Member Logic 310, KGS Logic 312, and LKH Logic 314. The GDOI Group Member Logic 310 implements Group Domain of Interpretation message sending, receiving, and processing as described in the IETF RFC 3547 and as further described herein for FIG. 4 and other parts of Section 3. The KGS Logic 312 implements creating and using KGS key matrices and related key generating functions as further described herein in connection with FIG. 4 and other parts of Section 3. The LKH Logic 314 implements generating and using logical key hierarchy processes as further described herein in connection with FIG. 4 and other parts of Section 3. To illustrate a clear example, GDOI Group Member Logic 310, KGS Logic 312, and LKH Logic 314 are shown as separate units in FIG. 3; in alternate embodiments, they may be implemented as a single functional unit, separate from or together with GDOI Pairwise Keying Logic 308.

In an embodiment, IPSec subsystem 320 comprises one or more circuits, gates, application-specific integrated circuits, program logic, or a combination that cooperate to implement the Internet protocol security processes described in IETF RFC 2401, IETF RFC 4301, and related specifications and subsequent versions thereof.

In an embodiment, crypto engine 330 comprises a central processing unit and support circuitry configured to encrypt and decrypt packets that are presented to the crypto engine. The KGS system uses finite field operations, which are similar to the operations used by the GCM mode of operation. As such, cryptographic hardware engines that support AES-GCM may be used to accelerate the KGS key generation operation. For example, crypto engine 330 may be configured to support AES-GCM.

Figure 4:
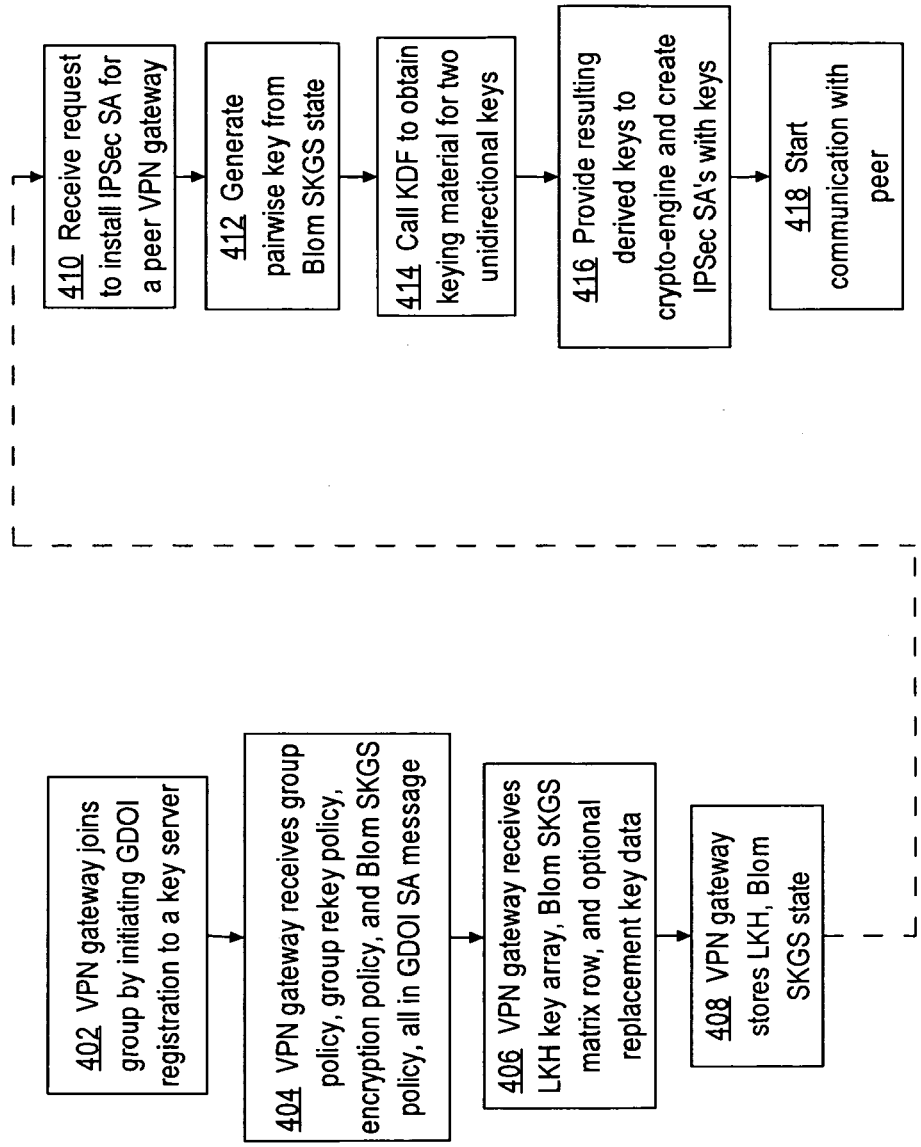
FIG. 4 illustrates an example process of generating pair-wise keys for tunneled VPNs.

In an embodiment, GDOI Group Member Persistent State Storage 316 comprises non-volatile memory, such as NVRAM, flash memory or disk storage, configured to store data structures and state values associated with GDOI, KGS, LKH, and the functions described further herein in relation to FIG. 4 and Section 3.

Each of the GDOI pairwise keying logic 308, GDOI group member logic 310, Blom SKGS logic 312, and LKH logic 314 may be implemented in various embodiments using a computer, one or more application-specific integrated circuits (ASICs) or other digital electronic logic, one or more computer programs, modules, objects, methods, or other software elements. For example, in one embodiment VPN gateway 302 may comprise a special-purpose computer having particular logic configured to implement the elements and functions described herein. In another embodiment, VPN gateway 302 may comprise a general purpose computer as in FIG. 2, loaded with one or more stored programs which transform the general purpose computer into a particular machine upon loading and execution.

In an embodiment, VPN Gateway 302 comprises a special-purpose computer configured as shown in FIG. 3 and additionally including a processor coupled to the logical units of FIG. 3, a switching system coupled to the interfaces 340, 342 and to the processor, and logic configured to implement routing protocols. Further, the processes described herein may be implemented to transform data representing routers, switches, and other computers acting as VPN gateways that is stored in the storage 316 from one state to another state.

FIG. 4 illustrates a process of generating pair-wise keys according to an embodiment. Aspects of FIG. 4 relating to GDOI, KGS, and LKH are now described.

3.1 GDOI Processing

Figure 5:
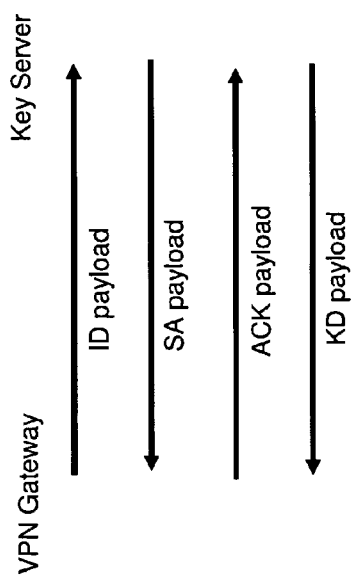
FIG. 5 illustrates a simplified overview of a group domain of interpretation (GDOI) registration message sequence.

In an embodiment, in step 402 of FIG. 4, a VPN gateway joins a group by initiating a GDOI registration to a key server. The GDOI registration protocol consists of four messages. FIG. 5 shows a simplified overview of the GDOI registration message, omitting payloads that are not necessary for purposes of this disclosure. In an embodiment, the GDOI protocol is followed as described in RFC 3547, but modified as follows.

1. The VPN gateway sends an ID payload message to the Key Server signifying a request to join a group. The VPN gateway uses the ID payload to pass a group identifier to the key server as in RFC 3547. The GDOI module is configured to check the authenticity of the group member.

2. The Key Server sends an SA payload message to the VPN gateway. The GDOI SA payload consists of an SA payload containing group-wise policy, a key encrypting key (KEK) element describing group rekey policy (including LKH policy), and a set of traffic encryption key (TEK or SA-TEK) values describing how to encrypt data packets. A new type of SA-TEK element passes the KGS policy information to the VPN gateway. In an embodiment, previously an administrator has determined how many (m) colluding VPN gateways the VPN should be resistant to, and has caused the KS to generate a (m×m) Blom matrix (D). Thus, as shown in step 404, the VPN gateway ultimately receives group policy, group rekey policy, encryption policy, and KGS policy all through a GDOI SA payload. GDOI provides confidentiality and authentication of the KGS data.

3. If the VPN gateway can satisfy the policy pushed to it in the SA, SA-KEK, and SA-TEK payloads, it returns an acknowledgement to the key server committing to becoming a group member, as in RFC 3547. In FIG. 5, the acknowledgment is represented as the ACK payload message.

4. When the VPN gateway acknowledges in the GDOI protocol that it can support the policy in the SA payload, the key server adds the VPN gateway to the group. Up to this point, the key server has not adjusted its, group state. In an embodiment, the key server adds the VPN gateway to an LKH tree, formats the correct LKH key array for the VPN gateway and adds it to the key distribution (KD) payload. To create the KGS SA-TEK, the key server assigns a value of "i" to the VPN gateway, computes row "i" of matrix (U), and places that row in the KD payload. If so configured, the key server also creates a pre-positioned KGS SA-TEK, super-encrypts it with the B-KEK, and places it in the KD payload. The KD payload is returned to the VPN gateway in the KD payload message seen in FIG. 5. As shown in FIG. 4, in step 406 the VPN gateway receives an LKH key array, KGS matrix row, and optional replacement key data.

In an embodiment, because much of the mathematics used by the KGS system is based on the same finite field algorithms used by the GCM mode of operation, the optimal size of "i" and "j" values is 128 bits. Use of 128-bit identifiers also provides the ability for the identifiers to be IP addresses (IPv4 or IPv6) in some use cases, and arbitrary values in other use cases. Use of IP addresses allows for a simpler overall system, but cannot be used in the presence of Network Address Translation (NAT). A more general solution uses arbitrary values of "i" assigned by the GDOI key server to each group member. Additional mechanisms that allow embodiments to function reliably in the presence of NAT are described in a separate section below.

In step 408, the VPN gateway stores the LKH data and KGS state. In an embodiment, in response to receiving the KD payload, the VPN gateway stores the LKH and KGS SA-TEK state in a GDOI group member persistent state area. A GDOI group member subsystem or module in the VPN gateway holds the KGS keying material, and derives keys later as necessary for IPsec.

At some point in time thereafter, as shown at step 410, the GDOI module receives a request to install an IPsec SA between itself and a particular peer VPN gateway. In response, the GDOI module generates the pair-wise key from the KGS state, as shown in step 412. Because the computed Blom keying material is related to other keying material in the matrix (K), using that keying material directly could subject the system to a related-key attack. The keying material is used a base for generating actual IPsec SA keys using a key derivation facility. Because IPsec installs unidirectional SAs, enough keying material is needed for two IPsec SAs.

In an embodiment, the key derivation mechanism complies with NIST requirements as stated in Section 5.1 of L. Chen, Recommendation for Key Derivation Using Pseudorandom Functions, NIST Special Publication 800-108, November 2008. The specific KDF used to generate keys is stored as part of IPsec SA policy, and can be distributed as part of the KGS SA-TEK. In an embodiment, the following key derivation process is used, which is based on a NIST-approved KDF.

In an embodiment, at step 414 the KDF is called to obtain keying material for each two uni-directional keys. This call requests enough keying material for two IPsec SAs (i.e., both cipher and authentication keying material for each SA). In an embodiment, input to the KDF is:

$K_j$: the Blom keying material shared between i and j

Label: "KGS PW KEY".

Context: The VPN gateway identities.

The output of the KDF is taken as the keying material for the two IPsec SAs. The output of the KDF is assigned to the IPsec SAs as indicated above.

When the KDF completes, at step 416 the GDOI group member logic pushes the derived keys into the crypto engine of the VPN gateway. The GDOI group member logic also requests the IPsec subsystem to create two IPsec SAs using those keys.

At step 418, the VPN gateway may begin encrypted communication with the peer VPN gateway with which an IPSec SA has been formed.

When gateways arranged in a full-mesh configuration use pair-wise keys, it is possible for them to install N−1 keys (where N is the total number of VPN gateways). However, when N is large (e.g., 2,000 or greater) it is not economical to require all VPN gateways to have the capacity of installing N−1 keys, particularly when the VPN gateway typically only needs a VPN connection to a few peer sites.

In an embodiment, limited-capacity VPN gateways can "time-out" IPsec SAs as part of the process of FIG. 4, and remove them from the crypto engine to free that resource for another tunnel. However, the VPN gateway retains the most-recently sent ESP sequence number associated with the IPsec SA (regardless of whether the IPsec SA is in the sending or receiving direction).

In some cases, a VPN gateway might not have an IPsec SA set up with a particular peer using the process of step 410 to step 416 before that peer sends its first packet. If the SPI in a received IPsec packet is valid, the receiving VPN gateway could validate that the packet is properly encrypted, and then set up the IPsec SA. However, this approach may open the VPN gateway to a denial of service attack.

Accordingly, key management for VPN gateways that use meshed VPN tunnels is improved using a method of group keying in which private pair-wise keys are derived between the VPN gateways. The method retains the scalability advantages that accrue from using a group controller instead of a full mesh of IKE sessions, while providing better security than a VPN that shares a group key across all gateways. These pair-wise keys are truly private between each pair of VPN gateways, because other authorized VPN gateways can only derive the pair-wise keys between themselves and their peers. Thus, no VPN gateway can eavesdrop on the traffic between other VPN gateways or successfully claim to be another VPN gateway.

3.2 ESP Sequence Numbers and Counter Mode IV

Because changing Blom SGKS keying material is complicated, a group is likely to use the same keys for an extended period of time. During this time, some VPN gateways may reboot, or may lose their current IPsec SA state due to some other reason. If those IPsec SAs are re-installed without any additional state, then a VPN gateway will not store the ESP sequence numbers it has previously used, and will start over at "1". Packets carrying such new ESP sequence numbers will appear to be replayed packets to peers, and the peers will drop such packets until the sequence number happens to exceed the previously used value. Further, a counter mode cipher (e.g., AES-GCM) may violate its security condition of never re-using an IV. In an embodiment, these conditions are avoided using an approach described in the next section.

Furthermore, if the KGS identifier "i" used by a VPN gateway is its IP address, and if either the ESP sequence number or counter mode IV is incremented to its largest value, then the IPsec SA may no longer be used. In this case, a replacement SA can only be had by moving to a new set of KGS values, which is not convenient. These issues can be addressed using the techniques described in the next section when the "i" value is chosen as a value other than an IP address.

3.3 Example Use Case: DMVPN (without NAT)

In an embodiment, the KGS may be applied to a DMVPN network that does not use NAT. In a practical implementation, NAT probably will be in use, but for purposes of describing a clear example, NAT is excluded in the present description.

Figure 6:
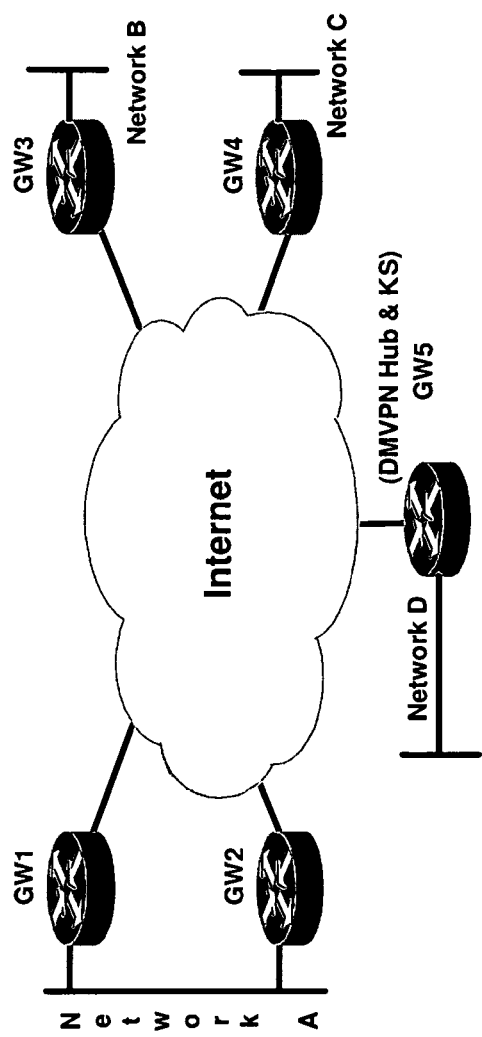
FIG. 6 illustrates a DMVPN network with five VPN gateways, where the VPN gateway acting as DMVPN hub also takes the role of the GDOI key server.

FIG. 6 shows a DMVPN network with five VPN gateways denoted GW1, GW2, GW3, GW4, and GW5. The VPN gateway GW5, acting as DMVPN hub, acts as GDOI key server. For redundancy, both GW1 and GW2 provide WAN service to "Network A". The following sections describe how this network is initialized and keying material is derived in this example. The following phases are described below: Key Server Initialization (describes processing performed on the GDOI key server to set up a group); GDOI Registration (describes processing to support the KGS); DMVPN Hub & Spoke Initialization (describes initial setup of IPsec SAs between the hub and spoke); DMVPN Spoke-to-Spoke Communications (describes steps performed by a spoke to contact another spoke directly).

3.3.1 Key Server Initialization

The following steps describe the initialization of the network.

1. The KS administrator determines the how many colluding VPN gateways that the VPN should be resistant, in this case 3. Using this parameter, the KS generates a (3×3) Blom matrix (D) filled with random values. No further processing is necessary at this time.

2. Once matrix (D) has been generated, the KS listens for GDOI registrations from VPN gateways.

3.32 GDOI Registration

1. Each VPN gateway contacts the key server using a GDOI registration protocol. After authentication and authorization the key server assigns the VPN gateway one row of matrix (K) (e.g., "i"). Because NAT is not part of this example, the KS uses the public IPv4 address of the VPN gateway as "i" (e.g., for 170.1.1.1, "i" would be set as 0x00000000000000000000000aa010101). The KS formats the SA-TEK containing the value of "i", and other Blom GCKS state values. It also generates an SA-KEK containing LKH policy.

2. When each VPN gateway acknowledges that it will become a group member (by sending the GDOI ACK payload), the KS generates the values in matrix (U) for row "i". The key server also stores the values locally, for use later in acting as a DMVPN hub. The key server also downloads a unique LKH key set to each VPN gateway for the purpose of future revocation. It also downloads a pre-positioned KGS SA-TEK with keying material encrypted under a key known only by the key server. At a later time, the key server may force a change to group membership with LKH, and then distribute the key under which the pre-positioned KGS keying material was encrypted.

3. Upon receipt of the KD payload, the VPN gateway extracts the KGS policy and keys along with the SA crypto policy and stores them in the GDOI group member subsystem. The GDOI group member subsystem holds the KGS keying material, and derives keys later as necessary for IPsec.

3.3.3 DMVPN Hub & Spoke Initialization

1. DMVPN operation begins when one of the "spoke" VPN gateways contacts the "hub" VPN gateway by sending it a next hop resolution protocol (NHRP) packet containing a mapping of its public IP address to its inside IP address. To do this, the spoke must know the KGS "j" value. Since the spoke has no outgoing IPsec SA for the hub, the IPsec subsystem will send a request to the GDOI group member code asking it to create an IPsec SA.

2. In this case, "requesting" the SA means directly generating it rather than contacting an IKE peer or GDOI KS (the usual cases). Rather, the GDOI KS has already been contacted and the KGS keying material is already in place. Because NAT is not part of this example, the VPN gateway uses the public IPv4 address of the Key Server/DMVPN Hub as "j". From its own "i" value and the hub's "j" value, the DMVPN spoke computes the keying material that it shares with the hub. It then delivers the two SAs to the IPsec subsystem.

3. The IPsec subsystem on the spoke installs the two SAs.

4. Because the DMVPN hub is also the KS, and it expects that the DMVPN spoke will be contacting it soon, it passes the KGS policy and keys to its own GDOI group member code. The GDOI group member code installs two IPsec SAs immediately.

5. The spoke sends an NHRP packet to the hub protected by IPsec ESP, using normal DMVPN processing.

6. The hub receives the IPsec ESP packet NHRP packet, performs an SA lookup, finds the correct IPsec SA, and decrypts the packet.

7. The hub and spoke can continue to communicate using the installed IPsec SAs in the normal fashion.

3.3.4 DMVPN Spoke-To-Spoke Communication

1. When a DMVPN hub recognizes that packets between spokes are flowing through it, the hub sends an NHRP mapping of private address to public address to both spokes. In a traditional DMVPN, the two spokes set up an IKE session between them to obtain IPsec SAs. Using the KGS method, the two spokes instead goes through the same key generation and IPsec SA installation process described between the hub and spoke as described above.

2. The two spokes then directly exchange encrypted packets in the normal DMVPN manner.

3.7 NAT Considerations

In current networks using tunnels (e.g., over the Internet), NAT must be presumed to be present and in use by some VPN gateways. Therefore, while the use of IP addresses as identifiers in the KGS is appealing, using them is not usually realistic. Most usages of the method described in this document will use "i" and "j" values that are chosen by some other means. However, this results in a significant complexity cost of mapping indices to public IP addresses in a reliable manner. The following sections describe additional goals for one embodiment and proposed methods for satisfying those goals as a part of a VPN using the KGS.

In one embodiment, in a system using the KGS including NAT, each group member MUST be assigned a unique group identity in the range of 1 to $2^{128}-1$. Group identities are chosen independent of network addresses representing the sender and/or destination of the packet. A group identity is mapped to a network addresses for the purposes of routing only, and is not used for identification.

If indices cannot be chosen as IP addresses, then they are allocated such that each group member is allocated a unique identifier. One simple scheme would be to assign group member identifiers from a sequence number, beginning from 1 and incrementing for as long as necessary. The group member identifier would be assigned during GDOI registration, probably as part of the KD payload.

A new group member identifier is allocated every time a VPN gateway registers (or re-registers). The key server cannot know when a group member rebooted and lost track of which IPsec sequence numbers that it had previously used with a set of pair-wise keys. Choosing a new identifier for each registration allows the group member to start its sequence numbers over at 1, because it will be using a new pair-wise key. Therefore, the IPsec ESP sequence numbers are incremented over the life of the SA. If the IPsec SA is de-installed and re-installed by a sender, it does re-use sequence numbers. Further, IPsec ESP counter mode Ws are maintained as unique over the life of the SA, and if the IPsec SA is de-installed and re-installed by a sender, it does not re-use IV values.

With a group member identifier space of $2^{128}$, exhaustion of the identifier space is unlikely. However, should the group member identifier space be exhausted, the key server moves the group to a new set of keying material. Further, whenever a group member loses track of its keys that it must re-register.

In order to send a packet protected by a pair-wise key, a VPN gateway needs a mapping of a group member identifier to the IP address it uses to send a packet to a peer. The method of mapping may be dependent on the tunnel method. For DMVPN, this mapping could be added to the NHRP message sent from a hub to the gateway. For a mesh of L2TPv3 or 6 to 4 tunnels, the mapping would need to be delivered through some other means. In any case, it would be possible to distribute this mapping in a GDOI rekey message.

However, a receiver of an IPsec packet cannot assume that IP source address in the IP header is correct. Some other method is required to pass this information between VPN gateways. In an embodiment, the Sender ID in the IV is used to identify a peer, if a counter mode cipher is used (e.g., AES-GCM) and the VPN gateways support the approach of D. McGrew, Weis B., Using Counter Modes with Encapsulating Security Payload (ESP) and Authentication Header (AH) to Protect Group Traffic, draft-ietf-msec-ipsec-group-counter-modes-02.txt, June, 2008.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Embodiments Also Encompass:

The apparatus of claim 1, wherein the group key management logic is configured to perform the receiving in response to sending a join request message to the key server.

The apparatus of claim 20, further comprising forwarding logic coupled to the plurality of network interfaces and when executed operable to receive packet flows and to forward the packet flows on the plurality of network interfaces, wherein the forwarding logic is further operable to encrypt data packets destined to the particular VPN gateway by using the pairwise key associated with the particular VPN gateway; send the encrypted data packets to the particular VPN gateway.

The apparatus wherein the KD payload further comprises a LHK key array, and the gateway logic is further operable to determine, based on the LHK key array, whether the particular VPN gateway has been compromised; and when the particular VPN gateway has been compromised, send a request to the GDOI key server to remove the particular VPN gateway from the a group security association.

The apparatus wherein the apparatus comprises a peer VPN gateway and comprises dynamic multipoint VPN (DM-VPN) logic operable to perform DMVPN encryption, decryption, and message communication functions.

The invention claimed is:

1. An apparatus, comprising:
an interface; and
a processor communicatively coupled with the interface and operable to communicate with a plurality of clients;
wherein the processor is operable to generate a first key matrix and a second key matrix, the first and second key matrices comprising key material for the plurality of clients;
wherein the processor is operable to encrypt data of the first key matrix with a first key associated therewith and data of the second key matrix with a second key associated therewith;
wherein the processor is operable to generate a security association message for at least one designated client of the plurality of clients, wherein the processor is operable to generate a distinct security association message for each designated client, wherein the security association message for each designated client comprises a designated encrypted row of the first key matrix, a designated encrypted row of the second key matrix, and the first key;
wherein the processor is operable to transmit the security association messages to each designated client; and
wherein subsequent to transmitting the security association messages to each designated client, the processor is operable to transmit a message containing the second key to at least a portion of the designated clients.

2. The apparatus as set forth in claim 1, wherein the processor is operable to communicate with the plurality of clients in conformance with a Group Key Management (GKM) protocol and a Key Generation System (KGS).

3. The apparatus as set forth in claim 2, wherein the GKM protocol is group domain of interpretation (GDOI) pairwise keying protocol and the KGS is Blom Symmetric Key Generation System (SKGS).

4. The apparatus as set forth in claim 3, wherein the processor is further operable to receive a join request from at least one client of the plurality thereof for the at least one client to be in data communication with the processor, at least one client, or combinations thereof, wherein the join request includes credential data associated with the at least one client.

5. The apparatus as set forth in claim 4,
wherein responsive to receiving a join request from the at least one client, the processor is further operable to determine, based on the credential data, if the at least one client is authorized to be in data communication with the processor, at least one client, or combinations thereof;
wherein responsive to a determination that the at least one client is authorized to be in data communication with the processor, at least one client, or combinations thereof, the processor is operable to allow the at least one client to be in data communication with the processor, at least one client, or combinations thereof.

6. The apparatus as set forth in claim 5, wherein the processor is operable revoke the authorization of at least one client to be in data communication with the processor, at least one client, or combinations thereof.

7. The apparatus as set forth in claim 6, wherein responsive to the processor revoking authorization of at least one client, the processor is operable to transmit a message containing the second key to at least a portion of the designated clients.

8. The apparatus as set forth claim 6, wherein responsive to the processor revoking authorization of at least one client, the processor is operable to transmit a message containing the second key to those designated clients that have not had their authorization revoked.

9. The apparatus as set forth in claim 1, wherein the message containing the second key includes a phased re-register flag.

10. A method, comprising:
generating, via a processor, a first key matrix and a second key matrix, the first and second key matrices comprising key material for a plurality of clients communicatively coupled to the processor;
encrypting data of the first key matrix with a first key associated therewith and data of the second key matrix with a second key associated therewith;
generating a security association message for at least one designated client of the plurality of clients, wherein a distinct security association message is generated for each designated client, wherein the security association message for each designated client comprises a designated encrypted row of the first key matrix, a designated encrypted row of the second key matrix, and the first key;
transmitting the security association messages to each designated client; and
subsequent to transmitting the security association messages to each designated client, transmitting a message containing the second key to at least a portion of the designated clients.

11. The method as set forth in claim 10, wherein the processor communicates with the plurality of clients in conformance with a Group Key Management (GKM) protocol and a Key Generation System (KGS).

12. The method as set forth in claim 11, wherein the GKM protocol is group domain of interpretation (GDOI) pairwise keying protocol and the KGS is Blom Symmetric Key Generation System (SKGS).

13. The method as set forth in claim 12, further comprising receiving a join request from at least one client of the plurality thereof for the at least one client to be in data communication with the processor, at least one client, or combinations thereof, wherein the join request includes credential data associated with the at least one client.

14. The method as set forth in claim 13,
wherein responsive to receiving a join request from the at least one client, determining, based on the credential data, if the at least one client is authorized to be in data communication with the processor, at least one client, or combinations thereof; and
wherein responsive to a determination that the at least one client is authorized to be in data communication with the processor, at least one client, or combinations thereof, allowing the at least one client to be in data communication with the processor, at least one client, or combinations thereof.

15. The method as set forth in claim 14, further comprising revoking the authorization of at least one client to be in data communication with the processor, at least one client, or combinations thereof.

16. The method as set forth in claim 15, wherein responsive to revoking authorization of at least one client, transmitting a message containing the second key to at least a portion of the designated clients.

17. The method as set forth claim 15, wherein responsive to revoking authorization of at least one client, transmitting a message containing the second key to those designated clients that have not had their authorization revoked.

18. The method as set forth in claim 10, wherein the message containing the second key includes a phased re-register flag.

19. An apparatus, comprising:
an interface; and
a processor communicatively coupled to the interface and operable to communicate with a plurality of clients in conformance with a Group Key Management (GKM) protocol and a Key Generation System (KGS);
wherein the processor is operable to generate a first key matrix and a second key matrix, the first and second key matrices comprising key material for the plurality of clients;
wherein the processor is operable to encrypt data of the first key matrix with a first key associated therewith and data of the second key matrix with a second key associated therewith;
wherein the processor is operable to transmit a first keying message containing a first row of the first key matrix, a first row of the second key matrix, and the first key to a first client selected from the plurality of clients;
wherein the processor is operable to transmit a second keying message containing a second row of the first key matrix, a second row of the second key matrix, and the first key to a second client selected from the plurality of clients; and
wherein subsequent to transmitting the first and second keying messages to the first and second clients, respectively, the processor is operable to transmit a first rekey message to the first client containing the second key and a second rekey message to the second client containing the second key.

20. A method, comprising:
generating, via a processor, a first key matrix and a second key matrix, the first and second key matrices comprising key material for a plurality of clients communicatively coupled to the processor;
encrypting data of the first key matrix with a first key associated therewith and data of the second key matrix with a second key associated therewith;
transmitting a first keying message containing a first row of the first key matrix, a first row of the second key matrix, and the first key to a first client selected from the plurality of clients;
transmitting a second keying message containing a second row of the first key matrix, a second row of the second key matrix, and the first key to a second client selected from the plurality of clients; and
wherein subsequent to transmitting the first and second keying messages to the first and second clients, respectively, transmitting a first rekey message to the first client containing the second key and a second rekey message to the second client containing the second key.

* * * * *